United States Patent
Browne et al.

(10) Patent No.: US 8,459,696 B2
(45) Date of Patent: Jun. 11, 2013

(54) DEPLOYABLE PROTECTION SYSTEM FOR VEHICLES WITH OVERHEAD GLASS

(75) Inventors: Alan L. Browne, Grosse Pointe, MI (US); Paul W. Alexander, Ypsilanti, MI (US); Jennifer P. Lawall, Waterford, MI (US); Nancy L. Johnson, Northville, MI (US); Hans P. Lawall, Waterford, MI (US); Gregory J. Vargo, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 393 days.

(21) Appl. No.: 12/783,316

(22) Filed: May 19, 2010

(65) Prior Publication Data

US 2011/0285120 A1 Nov. 24, 2011

(51) Int. Cl.
*B60R 21/13* (2006.01)
(52) U.S. Cl.
USPC ...... 280/756; 280/748; 280/753; 296/216.01; 296/216.04; 296/223; 180/282
(58) Field of Classification Search
USPC .......... 280/756, 748, 749, 751, 753; 180/271, 180/281, 282, 286; 296/216.01, 218, 219, 296/220.01, 216.04, 223
IPC ....................................... B60R 21/13
See application file for complete search history.

(56) References Cited

U.S. PATENT DOCUMENTS

| | | | | |
|---|---|---|---|---|
| 2,826,788 A | * | 3/1958 | Graham | 280/751 |
| 3,721,468 A | * | 3/1973 | Burgess | 280/753 |
| 5,167,296 A | * | 12/1992 | Schreier et al. | 180/281 |
| 6,189,960 B1 | * | 2/2001 | Mumura et al. | 296/212 |
| 6,520,572 B1 | * | 2/2003 | Niederman et al. | 296/219 |
| 7,967,339 B2 | * | 6/2011 | Usoro et al. | 280/801.2 |
| 2002/0167202 A1 | * | 11/2002 | Pfalzgraf | 296/214 |
| 2005/0172462 A1 | * | 8/2005 | Rudduck et al. | 24/606 |
| 2006/0033312 A1 | * | 2/2006 | Barvosa-Carter et al. | 280/728.1 |
| 2007/0068721 A1 | * | 3/2007 | Browne et al. | 180/274 |
| 2008/0129098 A1 | * | 6/2008 | Kennedy et al. | 297/354.1 |
| 2009/0174174 A1 | * | 7/2009 | McCoy | 280/749 |
| 2009/0278342 A1 | * | 11/2009 | Browne et al. | 280/756 |

* cited by examiner

*Primary Examiner* — Ruth Ilan

(57) ABSTRACT

An active material-enabled overhead protection system (24) for protecting the occupants of vehicles (20) with overhead glass (22), such as sunroofs or panoramic windshields, during rollover events. The system (24) includes a protective structure (26) and a deployment device (28). The protective structure (26) has a stowed condition in which it does not obstruct the overhead glass (22), and a deployed condition in which it is interposed between the overhead glass (22) and the heads of the occupants of the vehicle (20). The deployment device (28) moves the protective structure (26) from the stowed condition to the deployed condition. The deployment device (28) includes a trigger (30) operable to initiate movement of the protective structure (26), and the trigger (30) includes an active material which can change shape in response to an actuation signal, and the change in shape initiates deployment of the protective structure (26).

14 Claims, 4 Drawing Sheets

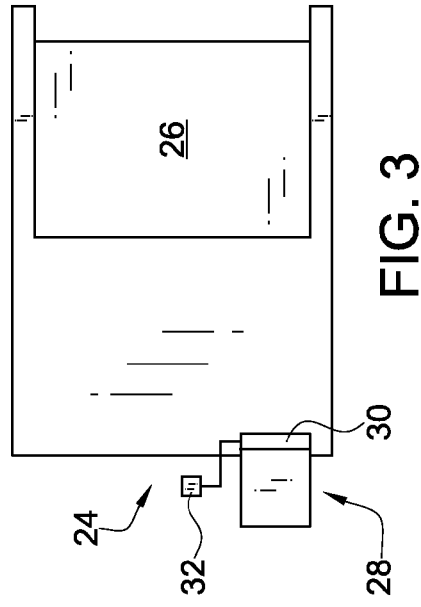
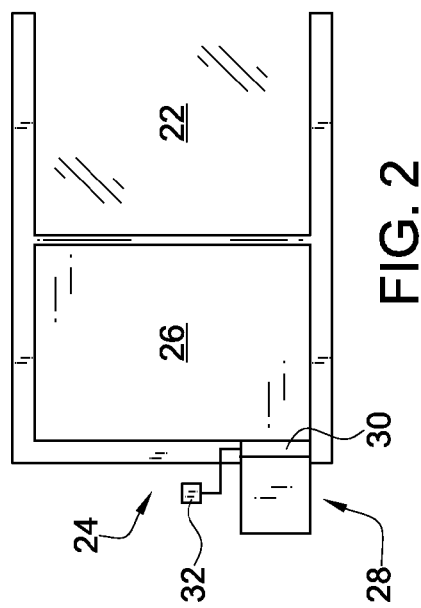
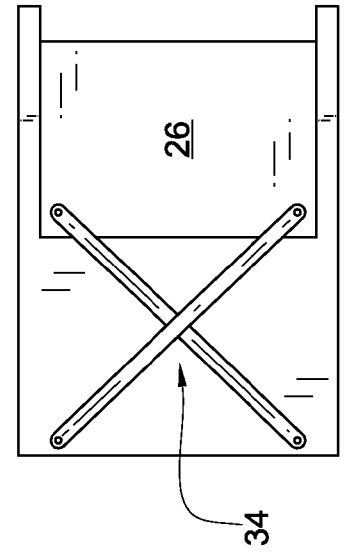
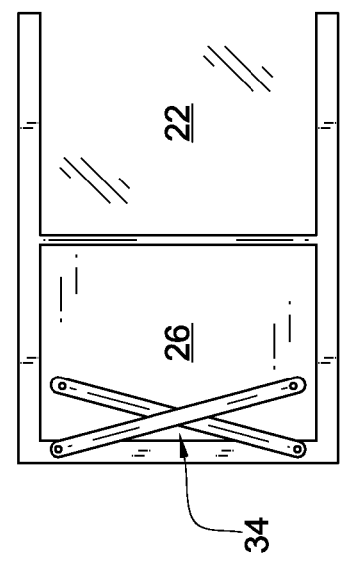

DEPLOYABLE PROTECTION SYSTEM FOR VEHICLES WITH OVERHEAD GLASS

BACKGROUND OF THE INVENTION

1. Technical Field

Generally, the present invention relates to systems for protecting the occupants of vehicles during crashes. More specifically, the present invention concerns a deployable system for protecting the occupants of vehicles with overhead glass during rollover events.

2. Background Art

Some newer vehicle designs are incorporating overhead glass in the form of e.g., large sunroofs and "panoramic" windshields that extend over the occupants' heads. During a rollover or other crash event the occupants' heads can impact the overhead glass which has less protective padding than conventional headliners, and the occupants can be partially or fully ejected from the vehicle through the glass or through the opening left by the damaged glass.

BRIEF SUMMARY

The present invention provides a deployable overhead protection system for protecting the occupants of vehicles with overhead glass, such as sunroofs or panoramic windshields, during rollover events. Broadly, the system comprises a protective structure having a stowed condition in which the protective structure does not significantly obstruct the overhead glass, and a deployed condition in which the protective structure is substantially interposed between the overhead glass and the head of the occupants of the vehicle; and a deployment device operable to move the protective structure from the stowed condition to the deployed condition, the deployment device including a trigger operable to initiate movement of the protective structure, and the trigger including an active material operable to change shape in response to an actuation signal, wherein the change in shape initiates deployment of the protective structure.

In various configurations of this embodiment, any one or more of the following features may be incorporated into the system. The active material may have an actuation temperature at which the change in shape is initiated, and the actuation signal may involve raising the temperature of the active material to at least the actuation temperature. The system may further include a sensor operable to detect a dangerous orientation of the vehicle, and to generate the actuation signal in response thereto. Movement of the protective structure may use stored energy, and the change in shape of the active material may initiate the release of the stored energy. The stored energy may be in the form of a compressed spring, and a blocking device, e.g., a pin, may maintain the spring in the compressed state, and the change in shape of the active material may move the blocking device so that the spring decompresses and the stored energy is released. The stored energy may be in the form of a compressed gas, and the blocking device, e.g., a valve, may maintain the gas in a compressed state, and the change in shape of the active material may open the blocking device so that the gas decompresses and the stored energy is released. The deployment device may include one or more arms operable to move between a folded configuration in which the protective structure is in the stowed position, and an open configuration in which the protective structure is in the deployed position.

The protective structure may be selectively stowed and deployed by the occupant of the vehicle without triggering the deployment device. The deployment device may be operable to relatively rapidly move the protective structure into the deployed condition in an emergency situation, and may be operable to relatively slowly move the protective structure into the deployed condition in a non-emergency situation. The protective structure may engage tracks that both support the protective structure and guide its movement between the stowed condition and the deployed condition. The protective structure may include one or more structural members operable to structurally reinforce the overhead portion of the vehicle. The protective structure may include padding or air bags defining an internal volume, and the internal volume may be connected to a gas source via a valve, e.g., a one-way valve, and the padding or air bags may be deflated and folded in the stowed condition and inflated and unfolded in the deployed condition as gas is transferred from the gas source to the internal volume via the valve. The protective structure may include expanded or unexpanded aluminum honeycomb material which is rapidly moved and/or expanded into the deployed condition. The protective structure may include a plurality of segments, wherein in the stowed condition the plurality of segments may be substantially overlapped and in the deployed condition the segments may be arranged substantially adjacent to each other. The protective structure may be upholstered. The protective structure may include a net.

Thus, in one exemplary configuration, the system may incorporate several of the aforementioned features as follows. The system, being configured for incorporation into a vehicle to protect one or more occupants of the vehicle from direct contact with an overhead glass component of the vehicle, comprises the protective structure having the stowed condition in which the protective structure does not significantly obstruct the overhead glass, and the deployed condition in which the protective structure is substantially interposed between the overhead glass and the head of the occupant of the vehicle; the deployment device operable to move the protective structure from the stowed condition to the deployed condition using stored energy, the deployment device including the trigger operable to release the stored energy and thereby initiate movement of the protective structure, and the trigger including an active material operable to change shape in response to an actuation signal, wherein the active material has the actuation temperature at which the change in shape is initiated, and wherein the actuation signal involves raising the temperature of the active material to at least the actuation temperature; and the sensor operable to detect the orientation of the vehicle in which the occupants of the vehicle are at risk of directly contacting the overhead glass component of the vehicle, and to generate the actuation signal in response thereto.

It will be appreciated that the system of the present invention provides a number of advantages when incorporated into vehicles with overhead glass. For example, the system helps to protect occupants from injury during rollover events. Furthermore, the system helps to prevent partial or full ejections of the occupants from the vehicle through the glass or through the opening left by the damaged glass. Furthermore, by making use of active materials, the system enjoys reduced mass, reduced packaging volume, reversibility, reduced cost, and reduced complexity over similar systems using conventional electro-mechanical devices.

Other aspects and advantages of the present invention are discussed in the following detailed description of the preferred embodiment(s) and depicted in the accompanying drawing figures.

BRIEF DESCRIPTION OF THE SEVERAL VIEWS OF THE DRAWING

A preferred embodiment(s) of the invention is described in detail below with reference to the attached drawing figures, wherein:

FIG. 2 is a bottom view of the roof of the vehicle of FIG. 1, wherein the system of the present invention is shown including a protective structure in a stowed condition that does not significantly obstruct the overhead glass;

FIG. 3 is a bottom view of the roof and the system of FIG. 2, wherein the protective structure is in a deployed condition that is substantially interposed between the overhead glass and the occupants of the vehicle;

FIG. 4 is a bottom view of the roof and the system of the present invention, wherein the system includes arms that are folded when the protective structure is in the stowed condition;

FIG. 5 is a bottom view of the roof and the system if FIG. 4, wherein the arms are unfolded when the protective structure is in the deployed condition;

DETAILED DESCRIPTION

Figure 1:
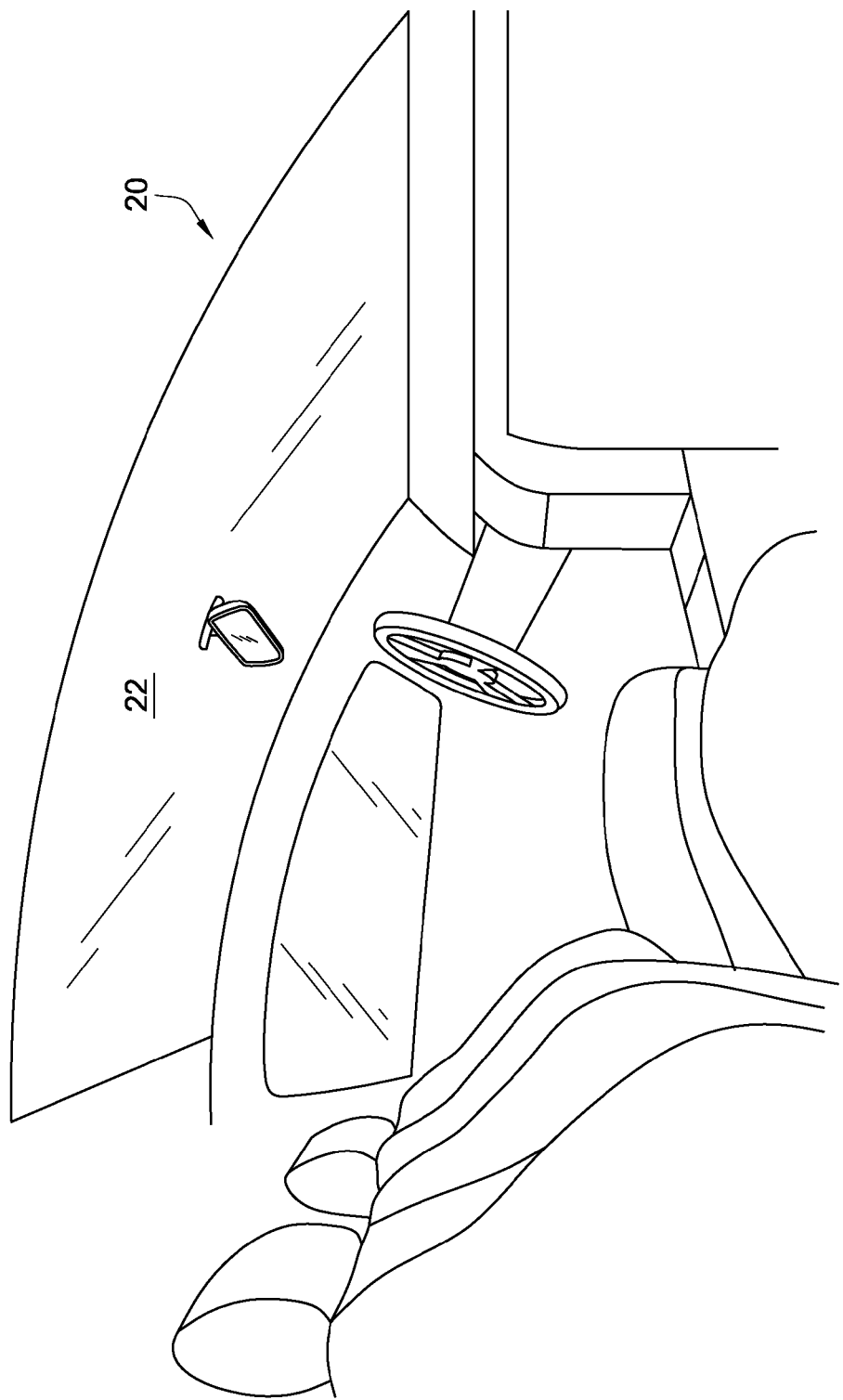
FIG. 1 is a perspective view looking into a vehicle having overhead glass.

The present invention provides deployable system for and related method of protecting the occupants of vehicles with overhead glass, e.g., sunroofs or panoramic windshields, during rollover events. Referring to FIG. 1, in a vehicle 20, an exemplary panoramic windshield 22 extends over the occupants' heads. Overhead glass provides less protection than conventional roofs upholstered with padded headliners. Computer simulations indicate that preventing direct contact between the occupants' heads and the hard glass during a rollover event, and preventing the occupants from being partially or fully ejected from the vehicle through the glass or through the opening left by the damaged glass, is important to good performance.

As shown in FIGS. 2 and 3, the system 24 broadly comprises a protective structure 26 having a stowed condition (seen in FIG. 2) in which the protective structure 26 does not significantly obstruct the overhead glass 22, and a deployed condition (seen in FIG. 3) in which the protective structure 26 is substantially interposed between the overhead glass 22 and the heads of the occupants of the vehicle 20; and a deployment device 28 operable to move the protective structure 26 from the stowed condition to the deployed condition, the deployment device 28 including a trigger 30 operable to initiate movement of the protective structure 26, and the trigger 30 including an active material operable to change shape in response to an actuation signal, wherein the change in shape initiates deployment of the protective structure 26.

Although various exemplary embodiments, configurations, and implementations are depicted and described herein, these are meant to illustrate and support rather than limit unless expressly incorporated into the claims. For example, the protective structure and the deployment device, may be substantially any such structures and devices suitable to accomplish the respective purposes of protection and deployment. Similarly, the active material may be substantially any such material, and may be incorporated into the trigger in substantially any way that accomplishes the purpose of triggering deployment. Relatedly, particular implementations of the system may use conventional or other triggers or triggering devices which do not involve active materials.

I. Active Material Discussion and Function

As used herein the term "active material" shall be afforded its ordinary meaning as understood by those of ordinary skill in the art, and includes any material or composite that exhibits a change in a fundamental (e.g., chemical or intrinsic physical) property when exposed to an activation signal. Thus, active materials include those compositions that can exhibit a change in, e.g., stiffness, shape, or dimension in response to the activation signal, which can take the type, for different active materials, of electrical, magnetic, thermal and like fields.

Suitable active materials for use with the present invention include but are not limited to shape memory materials such as shape memory alloys (SMAs) and shape memory polymers (SMPs). Shape memory materials generally refer to materials or compositions that have the ability to remember at least one original attribute such as shape, which can be subsequently recalled by applying the actuation signal. As such, deformation from the original shape is reversible. In this manner, shape memory materials can change to the original, or "trained", shape in response to the activation signal. Exemplary active materials include the aforementioned SMAs and SMPs, as well as shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like.

SMAs generally refer to a group of metallic materials that demonstrate the ability to return to some previously defined shape or size when subjected to an appropriate thermal stimulus. SMAs are capable of undergoing phase transitions in which their yield strength, stiffness, dimension, or shape are altered as a function of temperature. The term "yield strength" refers to the stress at which a material exhibits a specified deviation from proportionality of stress and strain. Generally, in the low temperature, or martensite phase, SMAs can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

SMAs exist in several different temperature-dependent phases. The most commonly utilized of these phases are the so-called martensite and austenite phases discussed above. In the following discussion, the martensite phase generally refers to the more deformable, lower temperature phase, whereas the austenite phase generally refers to the more rigid, higher temperature phase. When the SMA is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the SMA is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the SMAs are softer and more easily deformable in their martensitic phase and are harder, stiffer, and/or more rigid in the austenitic phase. In view of the foregoing, a suitable activation signal for use with SMAs is a thermal activation signal of sufficient magnitude to cause transformations between the martensite and austenite phases.

SMAs can exhibit a one-way shape memory effect, an intrinsic two-way effect, or an extrinsic two-way shape memory effect depending on the alloy composition and processing history. Annealed SMAs typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising SMA compositions that exhibit one-way memory effects do not automatically reform, and will likely require an external mechanical force to reform the shape.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a SMA composition that will cause the active materials to automatically reform themselves as a result of the above-discussed phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine an SMA composition that exhibits a one-way effect with another element that provides a restoring force to reform the original shape.

The temperature at which the SMA remembers its high temperature form when heated can be adjusted by slight changes in the composition of the alloy and through heat treatment. In nickel-titanium SMAs, for example, it can be changed from above about 100° C. to below about –100° C. The shape recovery process occurs over a range of just a few degrees and the start or finish of the transformation can be controlled to within a degree or two depending on the desired application and alloy composition. The mechanical properties of the SMA vary greatly over the temperature range spanning their transformation, typically providing the system with shape memory effects, superelastic effects, and high damping capacity.

Suitable SMA materials include, without limitation, nickel-titanium-based alloys, indium-titanium-based alloys, nickel-aluminum-based alloys, nickel-gallium-based alloys, copper-based alloys (e.g., copper-zinc alloys, copper-aluminum alloys, copper-gold, and copper-tin alloys), gold-cadmium-based alloys, silver-cadmium-based alloys, indium-cadmium-based alloys, manganese-copper-based alloys, iron-platinum-based alloys, iron-platinum-based alloys, iron-palladium-based alloys, and the like. The alloys can be binary, ternary, or any higher order so long as the alloy composition exhibits a shape memory effect, e.g., change in shape orientation, damping capacity, and the like.

Ferromagnetic SMA's (FSMA's) are a sub-class of SMAs. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. External magnetic fields may, for example, be produced using soft-magnetic core electromagnets, especially in automotive applications. Alternatively, a pair of Helmholtz coils may be used for fast response.

SMP's are a group of polymeric materials that demonstrate the ability to return to a previously defined shape when subjected to an appropriate thermal stimulus. SMPs are capable of undergoing phase transitions in which their shape is altered as a function of temperature. Generally, SMP's have two main segments: a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the material above the transition temperature of the soft segment. The temperature required for return to the original shape will depend on the particular material and the particular application.

For example, the permanent shape of the polymeric material may be a wire presenting a substantially straight shape and defining a first length and a first diameter, while the temporary shape may be a similar wire defining a second length less than the first length and a second diameter greater than the first diameter. In another embodiment, the material may present a spring having a first modulus of elasticity when activated and second modulus when deactivated.

Suitable SMPs include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components of an SMP include, but are not limited to, polyphosphazenes, poly(vinyl alcohols), polyamides, polyester amides, poly(amino acids), polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsesquioxane), polyvinylchloride, urethane/butadiene copolymers, polyurethane block copolymers, styrene-butadiene-styrene block copolymers, and the like.

Suitable piezoelectric materials include, but are not limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly(poly(vinylamine)backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton® and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof.

Electroactive polymers include those polymeric materials that exhibit piezoelectric, pyroelectric, or electrostrictive properties in response to electrical or mechanical fields.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, such as, for example, polymer blends comprising a silicone elastomer and an acrylic elastomer.

Materials used as an electroactive polymer may be selected based on one or more material properties such as a high electrical breakdown strength, a low modulus of elasticity (for large or small deformations), a high dielectric constant, and the like. Electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present invention may include compliant electrodes that conform to the shape of an electroactive polymer to which they are attached. The electrodes may be only applied to a portion of an electroactive polymer and define an active area according to their geometry. Various types of electrodes suitable for use with the present invention include structured electrodes comprising metal traces and charge distribution layers, textured electrodes comprising varying out-of-plane dimensions, conductive greases such as carbon greases or silver greases, colloidal suspensions, high aspect ratio conductive materials such as carbon fibrils and carbon nanotubes, and mixtures of ionically conductive materials. Suitable materials used in an electrode may include graphite, carbon black, colloidal suspensions, thin metals including silver and gold, silver-filled and carbon-filled gels and polymers, and ionically or electronically conductive polymers. It is understood that certain electrode materials may work well with particular polymers and may not work as well for others. By way of example, carbon fibrils may work well with acrylic elastomer polymers, but may not work as well with silicone polymers.

II. Exemplary Embodiments, Configurations, and Applications

In various configurations of the system 24, any one or more of the following features may be incorporated. The active material may have an actuation temperature at which the change in shape is initiated, and the actuation signal may involve raising the temperature of the active material to at least the actuation temperature. Referring again to FIGS. 2 and 3, the system 10 may further include a sensor 32 operable to detect a dangerous orientation of the vehicle 20, and to generate the actuation signal in response thereto.

Movement of the protective structure 26 from the stowed to the deployed condition may use stored energy, and the change in shape of the active material may initiate the release of the stored energy. For example, the stored energy may be in the form of a compressed spring, and a blocking device, e.g., a pin, may maintain the spring in a compressed state; and the change in shape of the active material may move the blocking device so that the spring decompresses and the stored energy is released. In another example, the stored energy may be in the form of a compressed gas, and the blocking device, e.g., a valve, may maintain the gas in a compressed state; and the change in shape of the active material may open the blocking device so that the gas decompresses and the stored energy is released.

Referring to FIGS. 4 and 5, the deployment device 28 may include one or more arms 34 operable to move between a folded or retracted configuration (seen in FIG. 4) in which the protective structure 26 is in the stowed position, and an open or extended configuration (seen in FIG. 5) in which the protective structure 26 is in the deployed position.

The protective structure 26 may be selectively stowed and deployed, to, e.g., increase privacy or decrease glare, by the occupant of the vehicle 20 without triggering the deployment device 28. Thus, the deployment device 28 may be operable to relatively rapidly move the protective structure 26 into the deployed condition in an emergency situation, and may be operable to relatively slowly move the protective structure 26 into the deployed condition in a non-emergency situation. Alternatively, a second, manual or automatic, deployment device may be provided for deploying the protective structure 26 in non-emergency situations.

Figure 6:
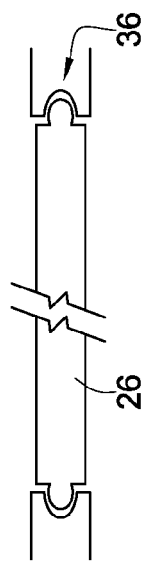
FIG. 6 is an end view of the protective structure shown engaging tracks.
Figure 7:
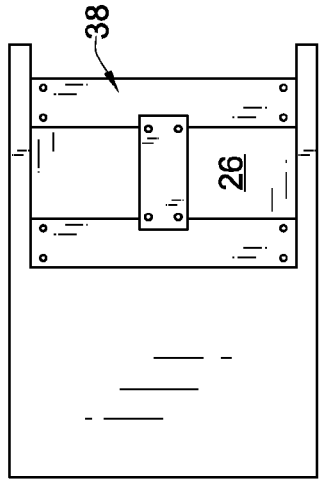
FIG. 7 is a bottom view of the roof and the system of the present invention, wherein the protective structure includes reinforcing cross-members.

Referring to FIG. 6, the protective structure 26 may engage tracks 36 that both support the protective structure 26 and guide its movement from the stowed to the deployed condition. Referring to FIG. 7, the protective structure 26 may include one or more structural members 38 operable to reinforce the roof of the vehicle 20, as further protection during a rollover event.

Figure 8:
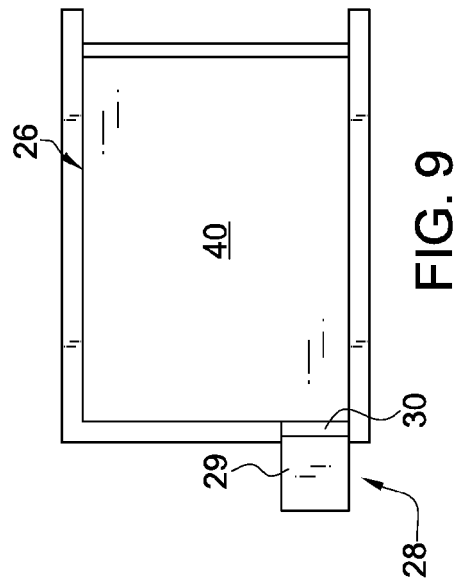
FIG. 8 is a bottom view of the roof and the system of the present invention, wherein the protective structure includes padding or air bags which are deflated and unfolded in the stowed condition.
Figure 9:
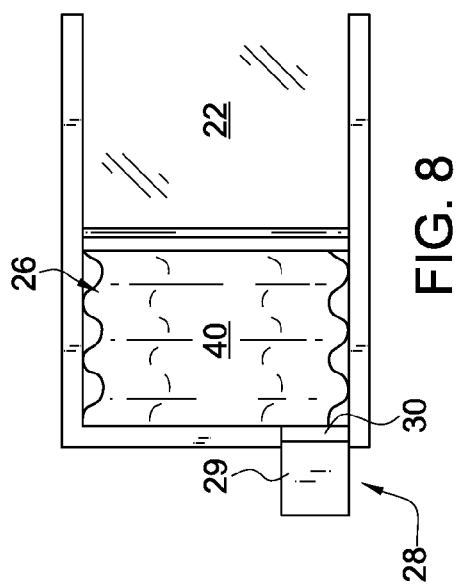
FIG. 9 is a bottom view of the roof and the system of FIG. 8, wherein the padding or air bags are inflated and rigidly elongated in the deployed condition.

Referring to FIGS. 8 and 9, the protective structure 26 may include inflatable padding or air bags 40 defining an internal volume, the internal volume may be connected to a gas source 29 component of the deployment device 28 via valve, e.g., a one-way valve, component of the trigger 30, and the padding or air bags 40 may be deflated and folded in the stowed condition (seen in FIG. 8) and inflated and unfolded in the deployed condition (seen in FIG. 9) as the gas is transferred from the gas source 29 to the internal volume via the valve.

Figure 10:
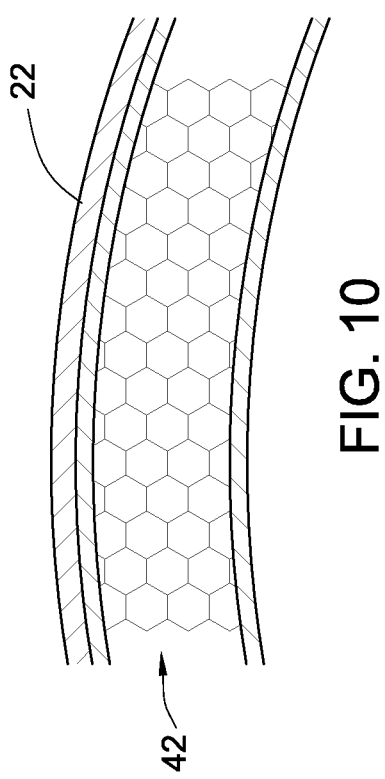
FIG. 10 is a cross-sectional elevation view of the roof and the system of the present in invention, wherein the protective structure includes aluminum honeycomb in the deployed condition.
Figure 12:
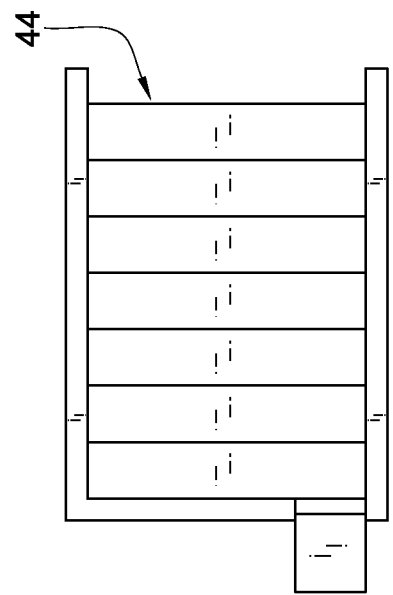
FIG. 12 is a bottom view of the roof and the system of FIG. 11, wherein the plurality of segments are substantially adjacent to one another in the deployed condition.
Figure 11:
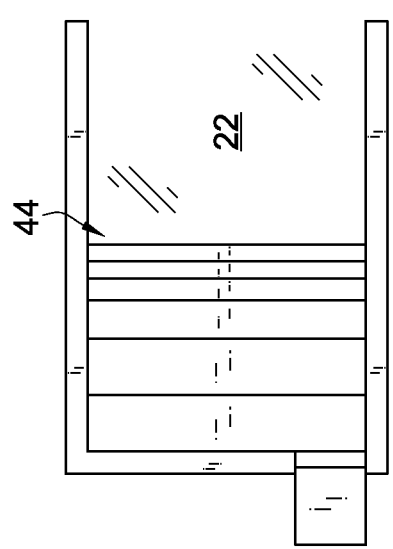
FIG. 11 is a bottom view of the roof and the system of the present invention, wherein the protective structure include a plurality of segments which are substantially overlapping in the stowed condition.

Referring to FIG. 10, the protective structure 26 may include expanded or unexpanded aluminum honeycomb material 42 which is rapidly moved and/or expanded into the deployed condition (seen in FIG. 10). Referring to FIGS. 11 and 12, the protective structure 26 may include a plurality of segments 44, wherein in the stowed condition the segments 44 may be substantially overlapped (seen in FIG. 11) and in the deployed condition the segments 44 may be arranged substantially adjacent to each other (seen in FIG. 12).

The protective structure 26 may be upholstered in, e.g., conventional headliner fabric. The protective structure 26 may include a net.

The following configuration illustrates the incorporation of several of the aforementioned features into the system 24. This exemplary system 24, being configured for incorporation into the vehicle 20 to protect the one or more occupants of the vehicle 20 from direct contact with the overhead glass 22, comprises the protective structure 26 having the stowed condition and the deployed condition; the deployment device 28 operable to move the protective structure 26 from the stowed to the deployed condition using stored energy, the deployment device 28 including the trigger 30 operable to release the stored energy and thereby initiate movement of the protective structure 26, and the trigger 30 including the active material operable to change shape in response to the actuation signal, wherein the active material has the actuation temperature at which the change in shape is initiated, and wherein the actuation signal involves raising the temperature of the active material to at least the actuation temperature; and the sensor 32 operable to detect the orientation of the vehicle 20 in which the occupants of the vehicle are at risk of directly contacting the overhead glass 22, and to generate the actuation signal in response thereto.

It will be appreciated that the system of the present invention provides a number of advantages when incorporated into vehicles with overhead glass. For example, the system helps to protect occupants from injury during rollover events. Furthermore, the system helps to prevent partial or full ejections of the occupants from the vehicle through the glass or through the opening left by the damaged glass. Furthermore, by making use of active materials, the system enjoys reduced mass, reduced packaging volume, reversibility, reduced cost, and reduced complexity over similar systems using conventional electro-mechanical devices.

As discussed, particular implementations of the system may use conventional or other triggers or triggering devices which do not involve active materials but which may be otherwise substantially similar or identical to the exemplary implementations discussed herein.

The present invention has been described with reference to exemplary embodiments, configurations, and applications; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment, configurations, or applications disclosed herein, but that the invention will include all embodiments, configurations, and applications falling within the scope of the appended claims. The terms "first," "second," and the like, as used herein do not denote any order, quantity, or importance, but rather are used to distinguish one element from another.

What is claimed is:

1. A system for incorporation into a vehicle to protect one or more occupants from direct contact with an overhead glass component of the vehicle, the system comprising:
   a protective structure having—
      a stowed condition in which the protective structure does not significantly obstruct the overhead glass, and
      a deployed condition in which the protective structure is substantially interposed between the overhead glass and the heads of the one or more occupants of the vehicle; and
   a deployment device operable to move the protective structure from the stowed condition to the deployed condition, the deployment device including a trigger operable to initiate movement of the protective structure, and the trigger including an active material operable to change shape in response to an actuation signal, wherein the change in shape initiates movement of the protective structure, wherein the deployment device includes one or more arms operable to move between a folded configuration in which the protective structure is in the stowed position, and an open configuration in which the protective structure is in the deployed position.

2. The system as set forth in claim 1, wherein the active material has an actuation temperature at which the change in shape is initiated, and wherein the actuation signal involves raising the temperature of the active material to at least the actuation temperature.

3. The system as set forth in claim 1, the system further including a sensor operable to detect a dangerous orientation of the vehicle and to generate the actuation signal in response thereto.

4. The system as set forth in claim 1, wherein movement of the protective structure uses stored energy, and the change in shape of the active material initiates the release of the stored energy.

5. The system as set forth in claim 4, wherein the stored energy is in the form of a compressed spring, and a blocking device maintains the spring in a compressed state, and the change in shape of the active material moves the blocking device so that the spring decompresses and the stored energy is released.

6. The system as set forth in claim 4, wherein the stored energy is in the form of a compressed gas, and a blocking device maintains the gas in a compressed state, and the change in shape of the active material opens the blocking device so that the gas decompresses and the stored energy is released.

7. The system as set forth in claim 1, wherein the protective structure can be selectively stowed and deployed by the occupant of the vehicle without triggering the deployment device.

8. The system as set forth in claim 1, wherein the protective structure engages one or more tracks that both support the protective structure and guide its movement between the stowed condition and the deployed condition.

9. The system as set forth in claim 1, wherein the protective structure includes one or more structural members operable to structurally reinforce the vehicle.

10. The system as set forth in claim 1, wherein the protective structure is upholstered.

11. The system as set forth in claim 1, wherein the protective structure includes a net.

12. A system for incorporation into a vehicle to protect one or more occupants from direct contact with an overhead glass component of the vehicle, the system comprising:
a protective structure having—
a stowed condition in which the protective structure does not significantly obstruct the overhead glass, and
a deployed condition in which the protective structure is substantially interposed between the overhead glass and the head of an occupant of the vehicle;
a deployment device operable to move the protective structure from the stowed condition to the deployed condition using stored energy, the deployment device including a trigger operable to release the stored energy and thereby initiate movement of the protective structure, and the trigger including an active material operable to change shape in response to an actuation signal, wherein the change in shape initiates movement of the protective structure;
wherein the deployment device includes one or more arms operable to move between a folded configuration in which the protective structure is in the stowed position, and an open configuration in which the protective structure is in the deployed position; and
a sensor operable to detect an orientation of the vehicle in which the one or more occupants of the vehicle are at risk of directly contacting the overhead glass component of the vehicle, and to generate the actuation signal in response thereto.

13. The system as set forth in claim 12, wherein the active material has an actuation temperature at which the change in shape is initiated, and wherein the actuation signal involves raising the temperature of the active material to at least the actuation temperature.

14. A system for incorporation into a vehicle to protect one or more occupants from direct contact with an overhead glass component of the vehicle, the system comprising:
a protective structure having—
a stowed condition in which the protective structure does not significantly obstruct the overhead glass, and
a deployed condition in which the protective structure is substantially interposed between the overhead glass and the head of an occupant of the vehicle;
a deployment device operable to move the protective structure from the stowed condition to the deployed condition using stored energy, the deployment device including a trigger operable to release the stored energy and thereby initiate movement of the protective structure, and the trigger including an active material operable to change shape in response to an actuation signal, wherein the active material has an actuation temperature at which the change in shape is initiated, and wherein the actuation signal involves raising the temperature of the active material to at least the actuation temperature, wherein the protective structure can also be selectively stowed and deployed by the one or more occupants of the vehicle without triggering the deployment device;
wherein the deployment device includes one or more arms operable to move between a folded configuration in which the protective structure is in the stowed position, and an open configuration in which the protective structure is in the deployed position; and
a sensor operable to detect an orientation of the vehicle in which the one or more occupants of the vehicle are at risk of directly contacting the overhead glass component of the vehicle, and to generate the actuation signal in response thereto.

* * * * *